(12) United States Patent
Chiang et al.

(10) Patent No.: US 9,594,847 B2
(45) Date of Patent: Mar. 14, 2017

(54) CACHE LONGEVITY DETECTION AND REFRESH

(71) Applicants: Frank Feng-Chun Chiang, Brighton, MA (US); Ashkan Nasseri, Somerville, MA (US)

(72) Inventors: Frank Feng-Chun Chiang, Brighton, MA (US); Ashkan Nasseri, Somerville, MA (US)

(73) Assignee: Apperian, Inc., Boston, MA (US)

( * ) Notice: Subject to any disclaimer, the term of this patent is extended or adjusted under 35 U.S.C. 154(b) by 175 days.

(21) Appl. No.: 14/065,770

(22) Filed: Oct. 29, 2013

(65) Prior Publication Data

US 2015/0121013 A1    Apr. 30, 2015

(51) Int. Cl.
*G06F 12/00* (2006.01)
*G06F 17/30* (2006.01)
*G06F 12/08* (2016.01)
*G06F 12/12* (2016.01)

(52) U.S. Cl.
CPC .... *G06F 17/30902* (2013.01); *G06F 12/0808* (2013.01); *G06F 12/0815* (2013.01); *G06F 12/121* (2013.01); *G06F 12/126* (2013.01); *G06F 12/123* (2013.01); *G06F 2212/1016* (2013.01)

(58) Field of Classification Search
CPC ............. G06F 12/0808; G06F 12/0815; G06F 12/0891
USPC .......................................................... 711/133
See application file for complete search history.

(56) References Cited

U.S. PATENT DOCUMENTS

2001/0034752 A1* 10/2001 Kremien .................... 709/105
2003/0061372 A1*  3/2003 Agarwalla et al. ........... 709/232
2013/0144736 A1*  6/2013 Vodopia ...................... 705/20
2013/0159087 A1*  6/2013 Boyd et al. ................ 705/14.33

* cited by examiner

*Primary Examiner* — Prasith Thammavong
(74) *Attorney, Agent, or Firm* — Chapin Intellectual Property Law, LLC

(57) ABSTRACT

A web server cache performs verification of cached computational results by storing a computed function result as a cached value in a cache, and upon receiving a subsequent invocation of the function, examining a duration of the value in the cache. The web server compares, if the duration exceeds a staleness detection threshold, a result of a subsequent execution of the function to the cached value in response to the subsequent invocation by recomputing, a result from execution of the function for validating the cached value, and flags an error if the duration exceeds the staleness detection threshold and the result differs from the cached value. Alternatively, the method returns, if the duration of the cache value is within the staleness detection threshold, the cache value as the result of the subsequent invocation.

19 Claims, 5 Drawing Sheets

CACHE LONGEVITY DETECTION AND REFRESH

BACKGROUND

In a server computing environment, servers are responsive to remote computing devices for focusing and consolidating services that are computationally or data intensive, to allow relatively lightweight computing appliances to leverage the power of the more robust server functionality. For example, a remote computing device such as a smartphone, tablet or laptop may have limited database resources. However, a network or wireless link to a database server can respond to requests from the database which would be infeasible for the remote computing device to support alone, due to the size of the database.

Accordingly, many computing environments equip lightweight and/or portable computing appliances (laptops, smartphones, PDAs and other personal computing devices) with applications (apps) for establishing a connection or link to a server for fulfilling computation requests that the lightweight appliance could not support on its own. For example, in some contexts, an enterprise management application provides networking, collaboration, and configuration support for a plurality of individual computing devices having a common purpose, motivation or direction, such as a particular business, organization or project. The enterprise management application coordinates application installation and oversees operation of the apps executing on each of the computing devices. The enterprise management application also facilitates access to a set of support servers for providing various services. Such services are likely to include data management, computation and retrieval services, and are further likely to be called upon for similar or related requests due to the common orientation of the enterprise. In other words, many users are likely to be invoking (requesting) the same or similar functions due to shared or common business goals. Often, a cache is employed for storing values likely to be called for within a short time, and returning the cache value as an alternative to reexecuting the function.

SUMMARY

A caching mechanism defines a staleness detection threshold indicative of a duration for which cached values remain active, and validates both the cached value and a refresh function value returned by the function that populated the cached value. In a debug or test mode, the validation helps ensure that cached values are invalidated by the invoking application, and flags an error if a mismatch is found between a cached value and a refresh value. Following the testing mode, the staleness detection threshold is extended so that cached values are relied upon to avoid duplicate computation of cached values, ideally after invalidation anomalies have been identified. A shorter staleness detection threshold identifies more invalidation errors, because cached values are checked for staleness more frequently, but also reduces performance since additional cached values are refreshed and compared to their cached counterparts. A more mature test phase allows the staleness detection threshold to extend, approaching Maxint or infinity, as cached values are more likely to be valid when invoked after a shorter interval, and a longer threshold therefore tends to catch more attenuated anomalies.

Configurations herein are based, in part, on the observation that applications can be prone to cache invalidation anomalies, characterized by a cached value persisting beyond a change in the underlying data. Unfortunately, conventional approaches to cache management suffer from the shortcoming that such so-called stale cache values are generally intended to be explicitly invalidated by the invoking application, however due to erroneous instructions or coder error this may not occur. Accordingly, configurations herein substantially overcome the above described shortcomings by employing a staleness detection threshold indicative of a duration of expected validity of the cache values, after which function invocations compare cached values to results of function execution. A mismatch between a function execution result and a counterpart cached value indicates an invalidation anomaly, in which the cached value should have been marked as invalid. The staleness detection threshold may be varied to detect invalidation anomalies occurring soon after caching, or set to a longer duration to identify stale cache values following a prolonged execution sequence. Following usage during a testing phase, the staleness detection threshold can be set to an infinite, Maxint or null to relay completely on cached values, avoiding the performance detriment that occurs when refreshed values are computed from function execution despite populated cache values. However, maintaining at least an extended staleness detection threshold provides ongoing protection from stale cache values, and impact performance only minimally as verification and recomputation is undertaken only for extended cache residence.

In further detail, in a caching environment, in which the cache is responsive for storing recently computed function results as values operable for satisfying successive invocations of the function, a method of verifying cached computational results includes storing a computed function result as a cached value in a cache, and upon receiving a subsequent invocation of the function, examining a duration of the value in the cache. The method compares, if the duration that the value has resided in the cache exceeds a staleness detection threshold, a result of a subsequent execution of the function to the cached value in response to the subsequent invocation. The function is reexecuted to recompute, if the duration exceeds the staleness detection threshold, a refreshed result from execution of the function for validating the cached value, and flags an error if the duration exceeds the staleness detection threshold and the result differs from the cached value. Alternatively, the method returns, if the duration of the cache value is within the staleness detection threshold, the cache value as the result of the subsequent invocation.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Depicted below is an example configuration of a managed application environment depicting an example configuration for caching computed results according to the caching method disclosed herein. Other configurations may employ the same or similar operations without departing from the ideas embodied herein. In the examples below, a web server, upon receiving the request, performs the disclosed method of caching computed values by performing a bifurcated operation in fetching cached values if the duration of time since the value was cached is within a staleness detection threshold. The staleness detection threshold is varied depending on a level of testing scrutiny, for detecting increasingly attenuated or delayed staleness (obsolescence of cached values) for a cached value that was not marked as invalidated. In the configurations below, if a cached value is found in the memory cache for a function call, and if the invocation occurs following the staleness detection threshold, the function is also called to refresh the value by reexecuting the function for accessing the database (or other computations performed by the function). The cached value and the refreshed function return value (i.e. the database value) are returned and compared to validate the cached value and verify that the value is not stale. While a database access function is employed as an example, the staleness detection threshold is applicable to any suitable cached value returned from a function.

Figure 1:
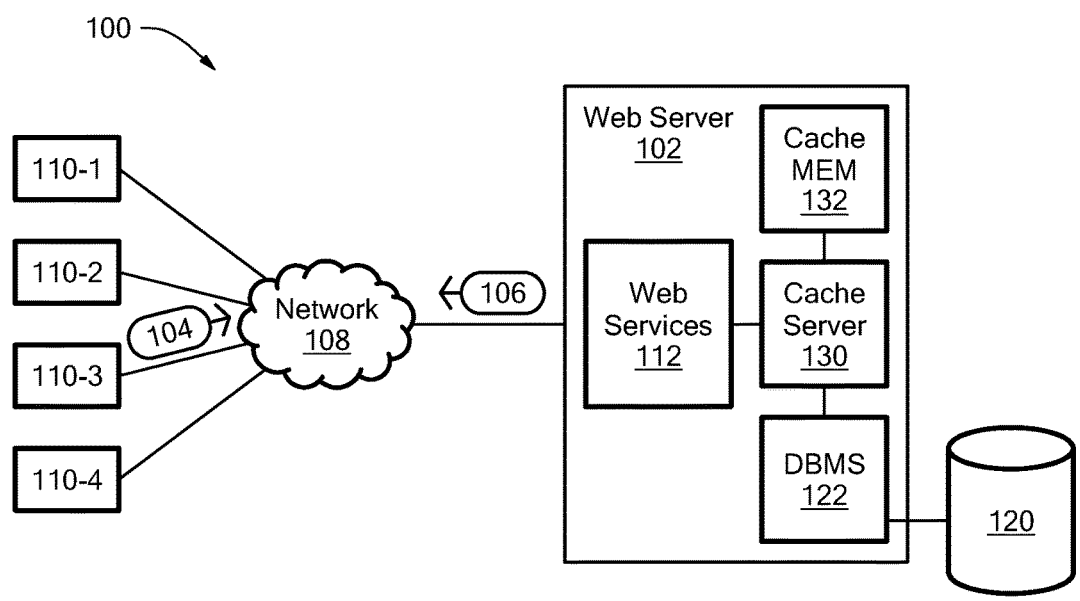
FIG. 1 is a context diagram of a caching computing environment suitable for use with configurations herein.

FIG. 1 is a context diagram of a caching computing environment 100 suitable for use with configurations herein. Referring to FIG. 1, in the server computing environment 100, a server 102 provides computing services to plurality of computing devices 110-1 . . . 110-4 (110 generally) via a network 108. The network 108 is a wired or wireless interconnection medium, such as the Internet, corporate intranet, and any combination of LANs or WANs (Local/Wide Area Networks). The computing devices 110 may be any suitable processing device, such as smartphones, laptops, tablets and other portable and desktop computing devices. In a particular configuration, the computing devices 110 may be iPad® devices responsive to an enterprise management application.

The server 102 includes a web services module 112 for receiving requests 104 for computing services and providing responses 106. The web services module 112 is a computing process or executable entity operable to provide the response 106. In conjunction with computing the response 106, a cache server 130 invokes a database (DB) manager 122 or cache memory 132. The cache server 130 determines if a request 104 can be fulfilled from previously computed or fetched values in the cache memory 132, or whether DB accesses need be incurred from the DB 120 to satisfy the request 104. The response 106 is then sent to the requesting computing device 110 using the cached or fetched values.

Figure 2:
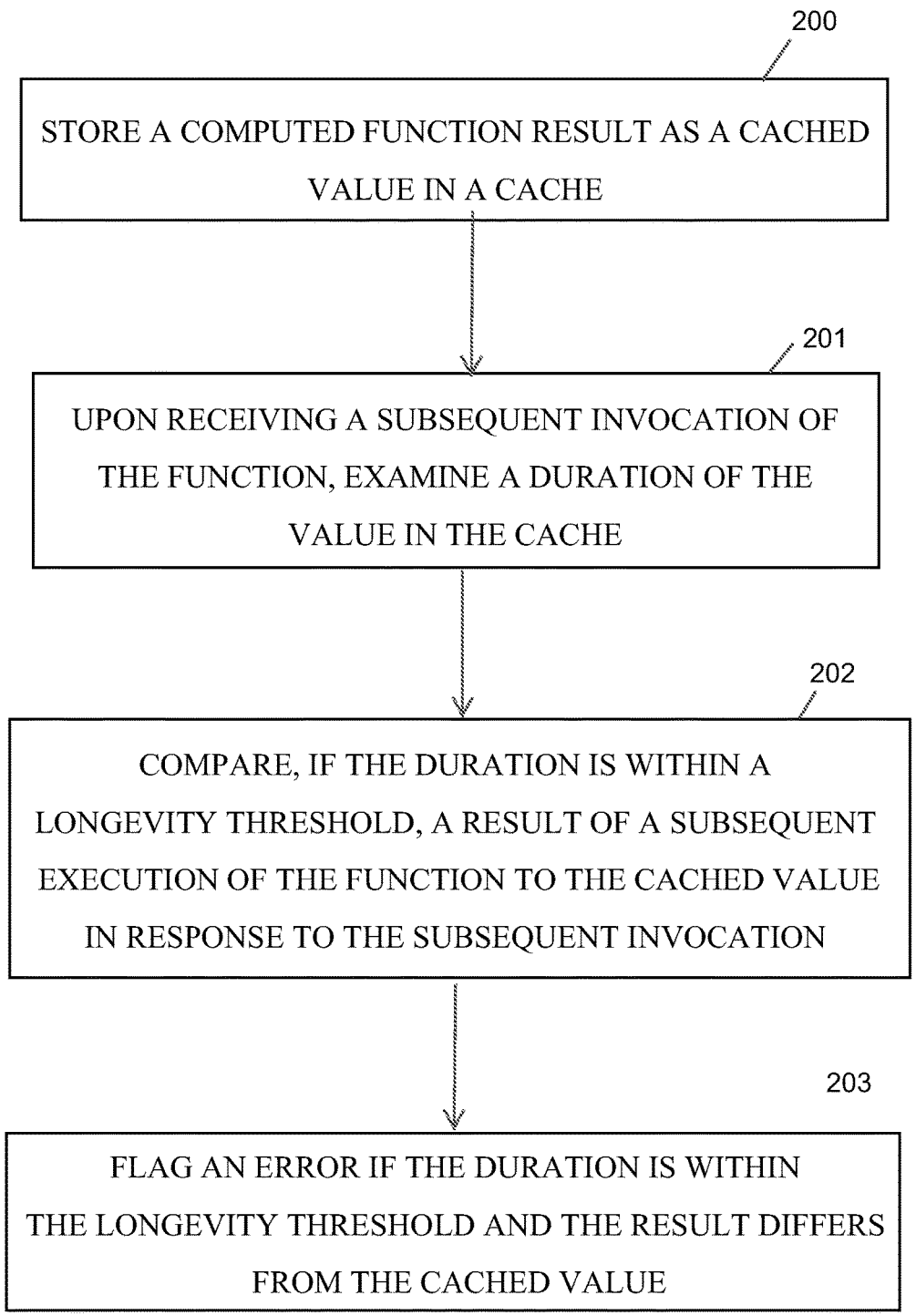
FIG. 2 is a flowchart of a cache usage in conjunction with configurations herein.

FIG. 2 is a flowchart of a cache usage in conjunction with configurations herein. Referring to FIGS. 1 and 2, In the caching environment 100, in which the cache 132 is responsive for storing recently computed function results as values operable for satisfying successive invocations of the function, the method of verifying cached computational results includes, at step 200, storing a computed function result as a cached value in a cache memory 132, and upon receiving a subsequent invocation of the function, examining a duration of the value in the cache, as depicted at step 201. The duration is indicative of the time since the cached value was last computed and/or fetched from the database 120. The cache server 130 compares, if the duration exceeds a staleness detection threshold, a result of a subsequent execution of the function to the cached value in response to the subsequent invocation, as depicted at step 202. Since the duration is based on a time since the value was computed and written to the cache, the staleness detection threshold identifies the window, or interval, outside of which values will be verified for freshness (non-staleness). The cache server 130 flags an error if the duration exceeds the staleness detection threshold and the result differs from the cached value, as depicted at step 203. In other words, when an executing app finds a cache hit, and if that cache key's duration is within the staleness detection threshold, then the function invocation returns the cached value without re-evaluating the function. Only if the cache key's duration has exceeded the staleness detection threshold, does the invocation re-evaluate the function and compare the cached value with the function return value (and throw an exception if different, since this means that the cached value is stale).

The verification need only be done in a debug/test environment because it temporarily eliminates the benefits of caching, since the cache server 130 resorts to the database (i.e. fresh computation) even upon a cache hit. However, variations may apply in a production environment as well. For example, a runtime modification of the staleness detection threshold sets N minutes. When a function result is cached, up to N minutes, the cached value is returned. After N minutes, upon a successive function call, a refresh value is computed via database access. If a mismatch (i.e. stale value) is detection, an exception or error is logged, but the correct, fresh result is returned. If the values are match (i.e. cached value is valid), then the staleness detection threshold is reset.

In another configuration, an exponential backoff approach is employed. Each iteration that yields a non-stale value results in the staleness detection threshold being increased exponentially, instead of simply employing a constant staleness detection threshold. This optimization hinges on the notion that confidence is increased each iteration of a non-stale cached value, thus less frequent staleness verification is needed, discussed further below.

Figure 3:
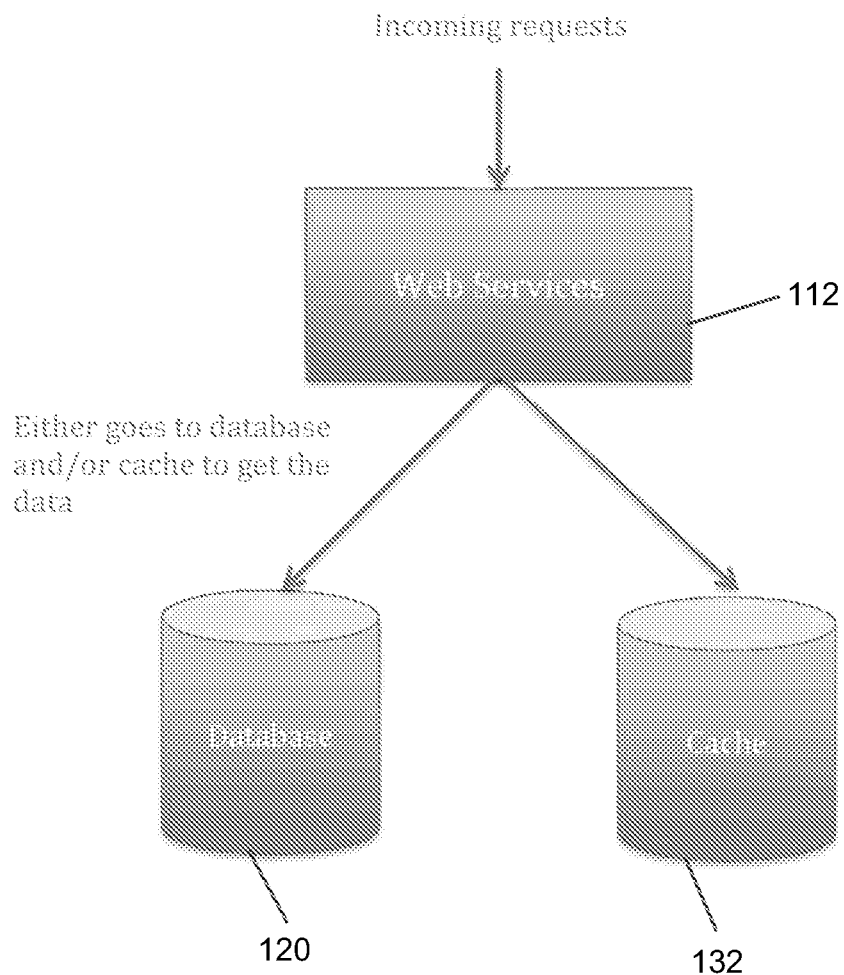
FIG. 3 is a diagram of cache flow in the environment of FIG. 1

FIG. 3 is a diagram of cache flow in the environment of FIG. 1. Referring to FIGS. 1 and 3, incoming requests are fielded by web services 112 in the web server. A function result, typically a database value fetch, is attempted to be satisfied first by the cache 132, in anticipation of a cache 132 hit. If no current cached value is found, i.e. cached value was previously invalidated or never computed/fetched, then the database 120 is sought for a fresh value (or computations result, as the case may be).

Figure 4:
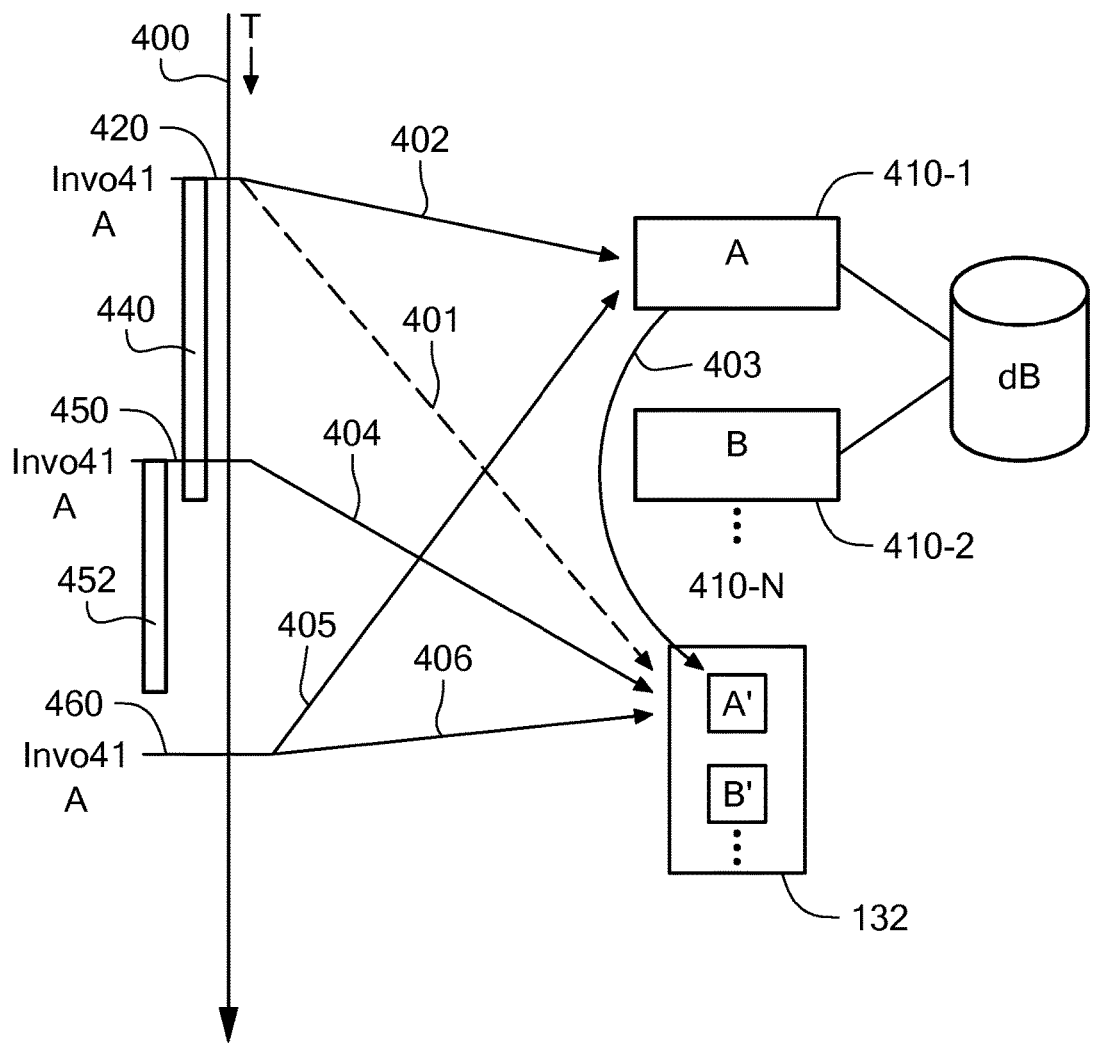
FIG. 4 is a diagram of cache usage according to FIG. 2.

FIG. 4 is a diagram of cache usage according to FIG. 2. Referring to FIGS. 1, 3 and 4, the web services 112 of the web server 102 include a plurality of applications (apps) or processes 400, executing according to a timeline, often defined by a program counter (PC) for executing sequential instructions in the process 400. The process includes a plurality of functions 410-1 . . . 410-N (410 generally). Each of the processes 410 is operable to return a cached value A', in cache memory 132. During execution, the process 400 encounters an invocation 420 of function A 410-1. The cache server 130 performs a check 401 of the cache and finds that this is the first invocation of function A 410-1. Accordingly, the invocation 420 results in an execution 402 of function A, which returns a function result, which is also stored in the cache memory 132 as a cached value A', shown as 403. The cached value A' also sets a staleness detection threshold 440 defining the time that the cached value A' is to be deemed accurate, i.e. not stale.

Subsequently, a second invocation of function A 450 is performed. A check 404 of the cache memory 132 identifies a cached result A'. Since the staleness detection threshold 440 has not yet expired, no cache verification is called for and the invocation 406 results in a cached value A' being found for satisfying the invocation of function A 410-1, and execution continues.

Subsequently, a third invocation 460 for A occurs. Since the staleness detection threshold 452 has expired, a fresh value for A is also computed 405 by execution of function A 410-1. The verification result from executing A is compared to the cached value A' to ensure that the cached value is still fresh, or to log an error if a stale entry (values unequal) is detected.

Figure 5:
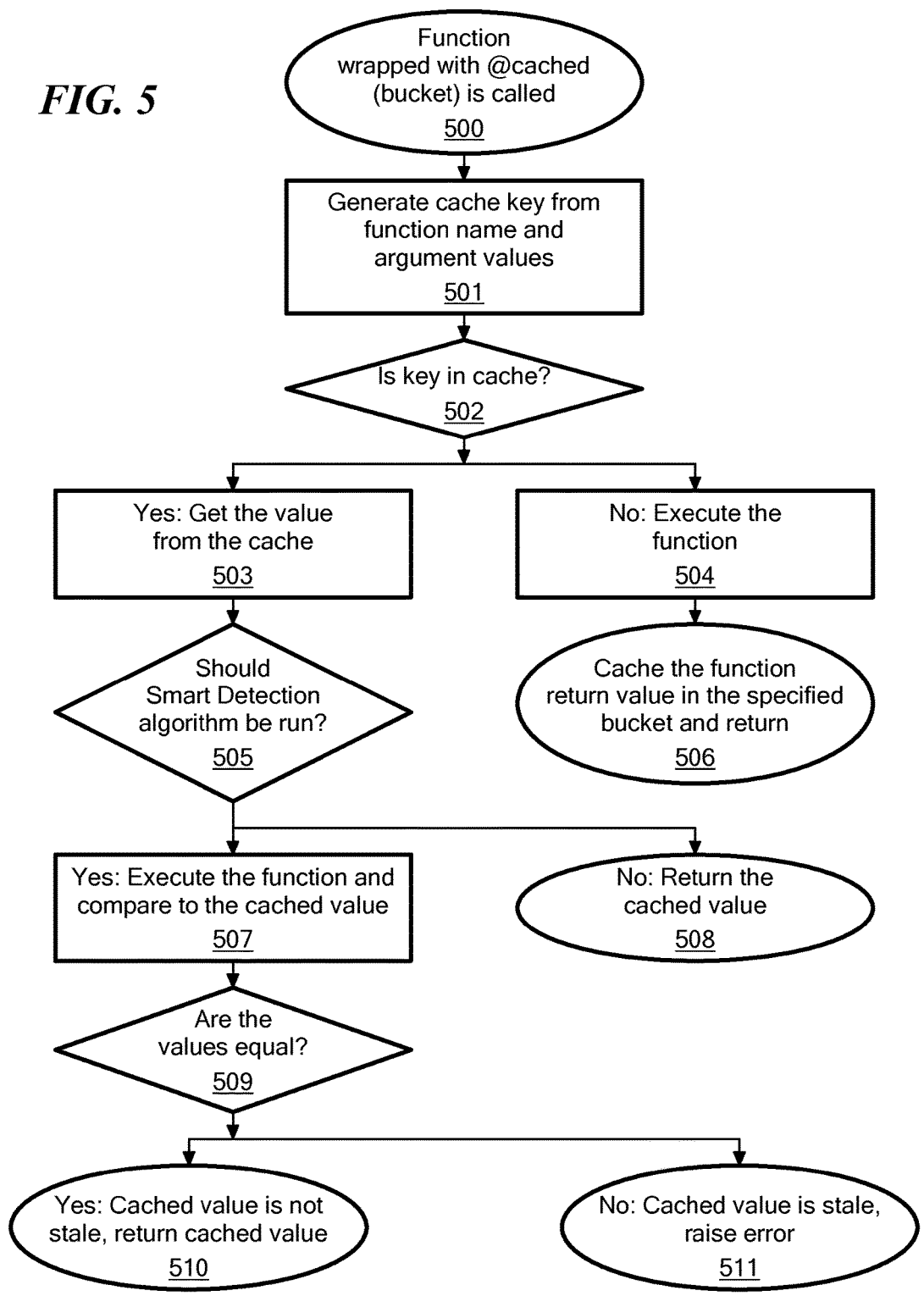
FIG. 5 is a flowchart of cache usage according to FIG. 4.

FIG. 5 is a flowchart of cache usage according to FIG. 4. FIG. 5 shows a further detail of the decision branching and conditions employed with the staleness detection threshold. Referring to FIGS. 1, 4 and 5, at step 500, functions are wrapped with a directive to indicate staleness detection threshold enforcement. The cache server 130 generates a cache key from the function name and argument values, as depicted at step 501. The hash generation ensures that only successive invocations with like parameters will generate a cache hit.

A check is performed, at step 502, to determine if the key is in the cache 132. This includes comparing a hash based on the subsequent invocation of the function 410 to a set of hash values corresponding to a plurality of cache values, and identifying a matching hash value based on comparing the hash. It should be further noted that the matching hash values are based on invocations of the function with common parameters, to ensure that the cached value corresponds to the successive (second) invocation of the function.

In the case of a match, the cache server 130 gets the value from the cache 132, as shown at step 503. If a match ("cache 'hit'") is not found, then the cache server 130 allows execution of the function 410, as depicted at step 504. Since no previous cache value was found to check for staleness, the cache server 130 caches the function return value and returns, as disclosed at step 506.

If a cache hit was found, then a check is performed, at step 506, to identify if a smart detection algorithm be run to verify the cached value A' with a refresh value from a fresh execution of function A 410-1. The verification compares a duration of the cache value A' corresponding to the matching hash value to the staleness detection threshold 440, in which the duration is defined by a previous execution of the function that stored the value A' in the cache 132. The cache server 130 executes the function 410 for recomputing, if the duration exceeds staleness detection threshold 440, a result from execution of the function for validating the cached value A'.

If the duration exceeds the staleness detection threshold, the function is executed, as disclosed at step 507, otherwise, no validation is called for and the cached value is returned as the function 410 invocation result, as depicted at step 508. Thus, the cache server 130 returns, if the duration of the cache value is within (i.e. less than) the staleness detection threshold 440, the cache value as the result of the subsequent invocation. In the case of returning the cache value A' without comparison (verification), a typical scenario is that the cache server has already properly received an invalidation command for denoting the cache entry as stale, receiving a subsequent invocation of the function, and computing a fresh value as a cache value by executing the function and storing the result in the cache 132. In this case, verification includes returning the cached value A' as the result of the subsequent invocation, in lieu of subsequent execution of the function, if the duration is within the staleness detection threshold.

Following the refresh execution, a check is performed to determine if the values are equal, as depicted at step 509. If the values are equal, then the cached value A' is not stale, and is returned as the cache invocation result, as depicted at step 510. If the comparison results in unequal values, the cache value is stale and the cache server raises an exception or error, as depicted at step 511. This includes replacing the cached value A' with the result from the subsequent execution for refreshing the cache 132 following staleness of the cached value A'. The cache server 130 flags an error based on the duration and mismatch of the result and the cached value.

In particular configurations, the staleness detection threshold is a runtime parameter response to dynamic modification based on a level of testing scrutiny, and can therefore be modified as testing matures to modify the window of cache invocation subject to verification. This may include receiving a command to modify the staleness detection threshold, and changing the staleness detection threshold in response to the command, such that the staleness detection threshold is indicative of a time (cached value age) after which cached values are checked for staleness. In other arrangements, the staleness detection threshold is modified according to an exponential backoff, such that a "trust" in the validity is extended according to an exponential factor as validity (non-staleness) continues to be verified. For example, a value could first be verified after 10 minutes, then the staleness detection threshold increased exponentially to 100 minutes, or some lesser, non-linear extension staleness detection threshold, imparting a greater "trust" in the cached value.

In another example arrangement, the verification is implemented such that invoking the function further comprises examining the staleness detection threshold based on a wrapping function. Other implementations, such as including verification in the cache server 130 for all cache 132 references, may also be implemented.

Those skilled in the art should readily appreciate that the programs and methods defined herein are deliverable to a user processing and rendering device in many forms, including but not limited to a) information permanently stored on non-writeable storage media such as ROM devices, b) information alterably stored on writeable non-transitory storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. In a caching environment, the cache responsive for storing recently computed function results as values operable for satisfying successive invocations of the function, a method of verifying cached computational results, comprising:
   storing a computed function result as a cached value in a cache;
   upon receiving a subsequent invocation of the function, examining a duration of the value in the cache;
   comparing, based on expiration of a staleness detection threshold, a result of a subsequent execution of the function to the cached value in response to the subsequent invocation of the function, further comprising comparing a hash based on the subsequent invocation of the function to a set of hash values corresponding to a plurality of cache values;
   identifying a matching hash value in the set of hash values based on the hash comparison;
   comparing a duration of the cache value corresponding to the matching hash value to the staleness detection threshold, the duration defined by a previous execution of the function;
   recomputing, if the duration exceeds the staleness detection threshold, a result from execution of the function for validating the cached value;
   returning, if the duration of the cache value is within the staleness detection threshold, the cache value as the result of the subsequent invocation; and
   flagging an error based on the duration and the staleness detection threshold if the result differs from the cached value.

2. The method of claim 1 wherein the duration is based on a time since the value was computed and written to the cache.

3. The method of claim 2 wherein the staleness detection threshold is a runtime parameter response to dynamic modification based on a level of testing scrutiny.

4. The method of claim 3 further comprising:
   receiving a command to modify the staleness detection threshold; and
   changing the staleness detection threshold in response to the command, the staleness detection threshold indicative of a time after which cached values are checked for staleness.

5. The method of claim 4 wherein the staleness detection threshold is modified according to an exponential backoff.

6. The method of claim 1 further comprising replacing the cached value with the result from the subsequent execution for refreshing the cache following staleness of the cached value.

7. The method of claim 1 further comprising returning the cached value as the result of the subsequent invocation, in lieu of subsequent execution of the function, if the duration is within the staleness detection threshold.

8. The method of claim 1 further comprising flagging an error based on the duration and mismatch of the result and the cached value.

9. The method of claim 8 wherein invoking the function further comprises examining the staleness detection threshold based on a wrapping function.

10. The method of claim 1 further comprising:
    receiving an invalidation command for denoting the cache entry as stale;
    receiving a subsequent invocation of the function; and
    computing a fresh value as a cache value by executing the function and storing the result in the cache.

11. The method of claim 1 wherein the matching hash values are based on invocations of the function with common parameters.

12. The method of claim 1 wherein the subsequent execution includes execution based on cached data.

13. A web server, comprising
    a cache memory responsive for storing recently computed function results as values operable for satisfying successive invocations of the function, the cache responsive to a function invocation for storing a computed function result as a cached value in a cache;
    a cache server operable for, upon receiving a subsequent invocation of the function, examining a duration of the value in the cache, the cache server further operable for comparing, if the duration is within a staleness detection threshold, a result of a subsequent execution of the function to the cached value in response to the subsequent invocation of the function, including comparing a hash based on the subsequent invocation of the function to a set of has values corresponding to a plurality of cache values;
    the cache server further configured to:
        identify a matching hash value in the set of hash values based on comparing the hash;
        compare a duration of the cache value corresponding to the matching hash value to the staleness detection threshold, the duration defined by a previous execution of the function;
        recompute, if the duration exceeds the staleness detection threshold, a result from execution of the function for validating the cached value; and
        return, if the duration of the cache value is within the staleness detection threshold, the cache value as the result of the subsequent invocation;
    a database interface for receiving function execution results.

14. The web server of claim 13 wherein the duration is based on a time since the value was computed and written to the cache.

15. The web server of claim 13 wherein the cache server is configured to replace the cached value with the result from the subsequent execution for refreshing the cache following staleness of the cached value.

16. The web server of claim 15 wherein the cache server is configured to return the cached value as the result of the subsequent invocation, in lieu of subsequent execution of the function, if the duration is within the staleness detection threshold.

17. The web server of claim 13 further comprising a runtime parameter such that the staleness detection threshold is a runtime parameter responsive to dynamic modification based on a level of testing scrutiny.

18. The web server of claim 13 further comprising:
    recomputing, if the duration exceeds the staleness detection threshold, a result from execution of the function for validating the cached value; and
    and returning, if the duration of the cache value is within the staleness detection threshold, the cache value as the result of the subsequent invocation.

19. A computer program product having instructions encoded on a non-transitory computer readable storage medium that, when executed by a processor, perform a method of maintaining cached computational results, the method comprising:

storing a computed function result as a cached value in a cache;

upon receiving a subsequent invocation of the function, examining a duration of the value in the cache; and comparing, if the duration exceeds a staleness detection threshold, a result of a subsequent execution of the function to the cached value, further comprising comparing a hash based on the subsequent invocation of the function to a set of hash values corresponding to a plurality of cache values;

identifying a matching hash value in the set of hash values based on the hash comparison;

comparing a duration of the cache value corresponding to the matching hash value to the staleness detection threshold, the duration defined by a previous execution of the function;

recomputing, if the duration exceeds the staleness detection threshold, a result from execution of the function for validating the cached value;

returning, if the duration of the cache value is within the staleness detection threshold, the cache value as the result of the subsequent invocation.

* * * * *